(12) United States Patent
Uehara et al.

(10) Patent No.: US 8,413,992 B2
(45) Date of Patent: Apr. 9, 2013

(54) SHAFT SEAL AND ROTARY MACHINE WITH SAME

(75) Inventors: Hidekazu Uehara, Tokyo (JP);
Tanehiro Shinohara, Tokyo (JP);
Takashi Nakano, Tokyo (JP); Shin Nishimoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/203,885

(22) PCT Filed: Jun. 9, 2010

(86) PCT No.: PCT/JP2010/003841
§ 371 (c)(1),
(2), (4) Date: Aug. 30, 2011

(87) PCT Pub. No.: WO2010/146805
PCT Pub. Date: Dec. 23, 2010

(65) Prior Publication Data
US 2011/0316237 A1 Dec. 29, 2011

(30) Foreign Application Priority Data
Jun. 16, 2009 (JP) ................. 2009-143140

(51) Int. Cl.
*F01D 11/02* (2006.01)
*F16J 15/44* (2006.01)
(52) U.S. Cl. ........................ 277/355; 277/411
(58) Field of Classification Search .......... 277/355, 277/411, 412
See application file for complete search history.

(56) References Cited

U.S. PATENT DOCUMENTS 6,267,381 B1 * 7/2001 Wright ................ 277/355
6,874,788 B2 * 4/2005 Kono ................... 277/355
(Continued)

FOREIGN PATENT DOCUMENTS

JP 2005-308039 11/2005
JP 3917993 5/2007
(Continued)

OTHER PUBLICATIONS

International Search Report issued Sep. 21, 2010 in International (PCT) Application No. PCT/JP2010/003841 w/English translation.

(Continued)

*Primary Examiner* — Vishal Patel
*Assistant Examiner* — Nathan Cumar
(74) *Attorney, Agent, or Firm* — Wenderoth, Lind & Ponack, L.L.P.

(57) ABSTRACT

A shaft seal that is constituted by annularly arranging a plurality of seal segments in the circumferential direction of a rotating shaft, in which each seal segment has a plurality of thin plates that are provided in a predetermined arrangement in the circumferential direction of the rotating shaft, side plates that sandwich the plurality of thin plates from both sides thereof in the axial direction, and retention rings that retain the base ends of the plurality of thin plates and the base ends of the side plates; the distal ends of the thin plates protrude farther toward the rotating shaft than the distal ends of the side plates, and the protrusion length of the distal ends of the thin plates in the vicinity of the end portions in the circumferential direction where adjacent seal segments are connected is set to be less than the protrusion length of the distal ends of the thin plates that are located at the middle of the seal segment in the circumferential direction.

16 Claims, 10 Drawing Sheets

U.S. PATENT DOCUMENTS

| | | | |
|---|---|---|---|
| 7,226,053 B2 * | 6/2007 | Nakano et al. | 277/355 |
| 7,334,328 B2 * | 2/2008 | Uehara et al. | 29/888.3 |
| 2002/0105146 A1 * | 8/2002 | Uehara et al. | 277/355 |
| 2005/0012275 A1 * | 1/2005 | Nakano et al. | 277/411 |
| 2007/0085277 A1 * | 4/2007 | Rhodes et al. | 277/355 |

FOREIGN PATENT DOCUMENTS

| | | |
|---|---|---|
| JP | 2009-281437 | 12/2009 |
| WO | 2008/004590 | 1/2008 |

OTHER PUBLICATIONS

Written Opinion of the International Searching Authority issued Sep. 21, 2010 in International (PCT) Application No. PCT/JP2010/003841 w/English translation.

* cited by examiner

SHAFT SEAL AND ROTARY MACHINE WITH SAME

TECHNICAL FIELD

The present invention relates to a shaft seal that performs sealing on a rotating shaft of a rotary machine such as a gas turbine, a steam turbine, a compressor, a water wheel, a freezer, a pump, and the like, and in particular to a shaft seal with a structure in which a plurality of plate-shaped thin plates are arranged in multiple layers in the circumferential direction of the rotating shaft.

Priority is claimed on Japanese Patent Application No. 2009-143140, filed Jun. 16, 2009, the content of which is incorporated herein by reference.

BACKGROUND ART

Generally, in a rotary machine such as a gas turbine or a steam turbine, an annular gap is formed between a stationary member such as a stator blade and a member that rotates such as a rotating shaft. A working fluid passing through this annular gap ends up leaking from the high-pressure side to the low-pressure side. In order to prevent this, a shaft seal device is used. As one such shaft seal device, a conventional non-contact type labyrinth seal has been widely used. However, with this type of shaft seal mechanism, it is necessary to ensure that the fin distal end does not make contact with the surrounding members due to a shaft oscillation in a rotation transitional period or a thermal deformation due to a thermal transitional thermal deformation. For that reason, it is necessary to enlarge to some extent the space at the fin distal end, that is, the seal clearance, and thereby the leakage amount of the working fluid is increased.

Figure 9:
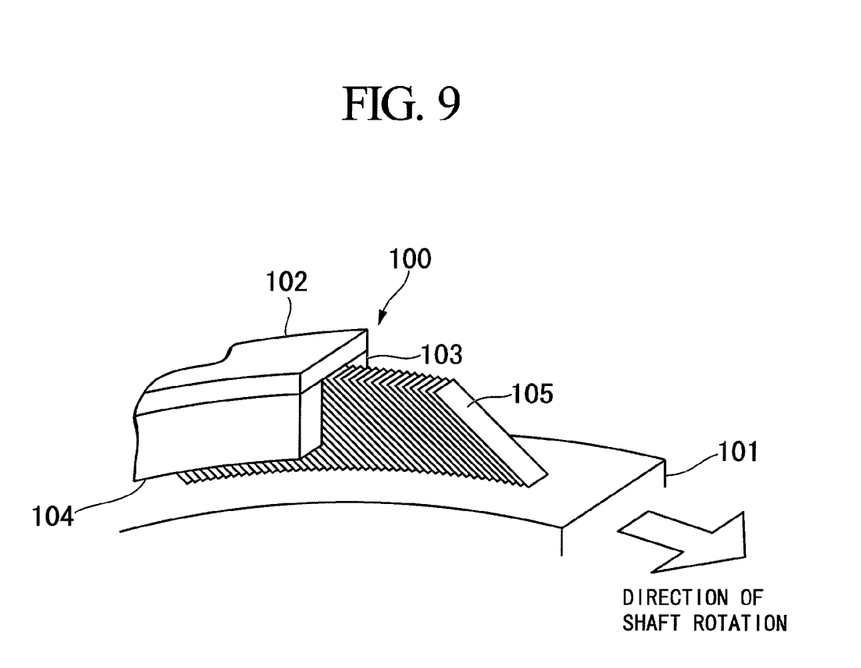
FIG. 9 is a perspective view that shows an example of the constitution of the shaft seal.

As a technique for reducing the leakage amount of a working fluid in this kind of shaft seal mechanism, there is known a shaft seal that has a structure in which a thin plate having a predetermined width dimension in the axial direction of the rotating shaft is arranged in multiple layers in the circumferential direction of the rotating shaft (for example, refer to Patent Document 1). FIG. 9 shows an example of the configuration of this shaft seal. FIG. 9 is a perspective view that shows the configuration of the shaft seal.

This shaft seal 100 has a housing 102 that is arranged so as to surround the rotating shaft 101 at the outer periphery of the rotating shaft 101, and thin plates 105 that are fitted to the housing 102 and provided in a predetermined arrangement having a ring shape in the circumferential direction of the rotating shaft 101. In this shaft seal 100, as a result of the thin plates 105 sealing the outer periphery of the rotating shaft 101, the space surrounding the rotating shaft 101 is partitioned into a high-pressure side region and a low-pressure side region with the thin plates 105 serving as a boundary. A high-pressure side plate (side leaf) 104 is provided on the high-pressure side of the thin plates 105, and a low-pressure side plate (back leaf) 103 is provided on the low-pressure side of the thin plate 105. The high-pressure side plate 104 and the low-pressure side plate 103 are mounted on the housing 102 as guide plates that support the thin plates 105.

In this kind of shaft seal 100, although the distal ends of the thin plates 105 come into contact with the rotating shaft 101 with a predetermined pre-load when the rotating shaft 101 is stopped, since a lift force acts on the thin plates 105 due to the hydrodynamic effect when the rotating shaft 101 rotates, the distal ends of the thin plates 105 float up from the rotating shaft 101. Thereby, the thin plates 105 and the rotating shaft 101 enter a contactless state during rotation of the rotating shaft 101, and so prevention of wear between each thin plate and the rotating shaft is achieved.

CITATION LIST

Patent Documents

[Patent Document 1] Japanese Patent No. 3917993

SUMMARY OF THE INVENTION

Problem that the Invention is to Solve

However, when attaching the rotating shaft 101 to a large rotary machine, it is difficult to attach it by inserting the shaft seal 100 from the end portion thereof. For that reason, from the aspect of ease of assembly, the shaft seal 100 that is constituted in a ring shape along the outer periphery of the rotating shaft 101 is constituted as a plurality of seal segments serving as split rings divided into two to eight segments along the circumferential direction. The shaft seal 100 that has an annular shape is constituted by connecting the end portions in the circumferential direction of these seal segments with adjacent seal segments.

When mounting the shaft seal 100 that is constituted as a plurality of seal segments on the outer periphery of the rotating shaft 101, a gap is formed between the end portions in the circumferential direction that are connection portions of the adjacent seal segments. The working fluid that heads from the high-pressure side region to the low-pressure side region passes through this gap. That is, a flow path of the working fluid from the high-pressure side region to the low-pressure side region is formed.

Figure 10:
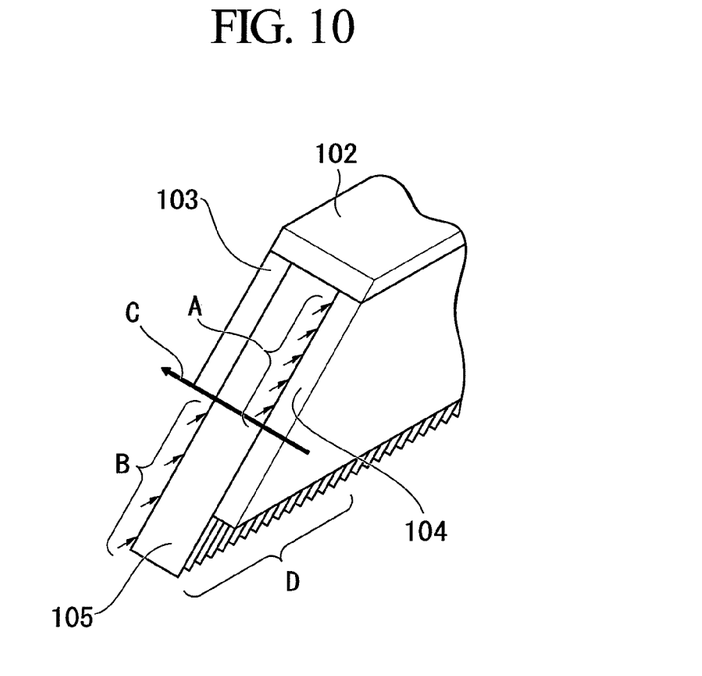
FIG. 10 is a perspective view that shows an aspect of the end portion of the seal segment in the circumferential direction.

FIG. 10 is a perspective view showing the aspect of the end portion of the seal segment in the circumferential direction. Since the flow passage is formed by the gap as mentioned above, flow C of the working fluid arises in the gap. Furthermore, flow A that leaks between the high-pressure side plate 104 and the thin plate 105, and flow B that leaks between the low-pressure side plate 103 and the thin plate 105 occur. Due to these leakage flows A and B, the pressure distribution between the thin plates 105 in the vicinity of the end portion in the circumferential direction of the seal segment becomes unsteady. For that reason, a pressing force that presses the thin plates 105 toward the rotating shaft 101 side acts against the lift force. Then, due to the generation of this pressing force, the lift force of the thin plates 105 is offset, and the lift characteristic of the thin plates 105 falls. As a result, the proper gap between the thin plates 105 and the outer periphery of the rotating shaft 101 can no longer be formed. For that reason, there has been the problem of wear of the thin plates 105 and the rotating shaft 101 due to the contact between the thin plates 105 and the rotating shaft 101 during high-speed rotation.

In contrast to this, in the shaft seal disclosed in the aforementioned Patent Document 1, by setting the gap in the vicinity of the split portions of the shaft seal (in the vicinity of the end portions of the seal segment in the circumferential direction) to be larger than the other gap in the circumferential direction excluding the vicinity of the split portions, a proper pressure distribution is achieved, and thereby the pressing force acting on the thin plates 105 is lessened. However, even by doing so there are cases in which it is not possible to recover the lift characteristic of the thin plates 105. In particular, during high-speed rotation of the rotating shaft 101, contact occurs between the thin plates 105 and the rotating shaft 101, leading to wear of the thin plates 105 and the rotating shaft 101.

The present invention was achieved in view of the above circumstances, and has as its object to provide a shaft seal that, by avoiding contact of the thin plates with the rotating shaft during rotation in the vicinity of the end portions of seal segments in the circumferential direction, is capable of achieving prevention of wear between each thin plate and the rotating shaft and effectively inhibiting leakage of working fluid, and a rotary machine that is provided with the shaft seal.

Means for Solving the Problem

In order to solve the issues, the present invention provides the following means.

The shaft seal according to the present invention is a shaft seal that is constituted by annularly arranging a plurality of seal segments in the circumferential direction of a rotating shaft, in which each seal segment includes a plurality of thin plates that are provided in a predetermined arrangement in the circumferential direction of the rotating shaft; side plates that sandwich the plurality of thin plates from both sides thereof in the axial direction; and retention rings that retain the base ends of the plurality of thin plates and the base ends of the side plates; the distal ends of the thin plates protrude farther toward the rotating shaft than the distal ends of the side plates; and the protrusion length of the distal ends of the thin plates in the vicinity of the end portions in the circumferential direction where adjacent seal segments are connected is set to be less than the protrusion length of the distal ends of the thin plates that are located at the middle of the seal segment in the circumferential direction.

According to the shaft seal with such characteristics, since the protrusion length of the distal ends of the thin plates is set to be small in the vicinity of the end portions in the circumferential direction of the seal segments where the pressure distribution becomes unstable due to fluid leakage, even if the lift characteristic of the thin plates has decreased due to a pressing force acting on the thin plates during rotation, it is possible to prevent the distal ends of the thin plates from making contact with the rotating shaft.

The protrusion length of the thin plates in the vicinity of the end portions in the circumferential direction may gradually become small heading from the inner side of the seal segment in the circumferential direction toward the end portions in the circumferential direction.

Here, the pressure distribution due to fluid leakage enters its most unstable state at the circumferential-direction end portions of the seal segment, and is gradually resolved heading toward the inside in the circumferential direction. Accordingly, the pressing force that occurs on the thin plates also becomes greatest at the circumferential-direction end portions of the seal segment and becomes smaller heading toward the inside in the circumferential direction. On the other hand, in order to prevent the working fluid from leaking, it is not preferable for the gap between the distal ends of the thin plates and the outer peripheral surface of the rotating shaft during rotation, that is, the seal clearance, to increase.

In contrast, in the present invention, the protrusion length of the thin plates is set so as to gradually become smaller from the inner side of the seal segment in the circumferential direction to the circumferential-direction end portions. Therefore, in the event of the pressing force acting on the thin plates during rotation, it is possible to maintain the seal clearance at the minimum and effectively inhibit leakage of the working fluid from the high-pressure side to the low-pressure side while maintaining non-contact between the distal ends of the thin plates and the rotating shaft.

A region where the protrusion length of the thin plates in the vicinity of the end portions in the circumferential direction is set to be small may be a region where the lift force relatively decreases with respect to the middle portion in the circumferential direction.

According to the shaft seal with these characteristics, by reducing the protrusion length of the thin plates at the region where the lift force relatively decreases with respect to the middle portion in the circumferential direction, that is, the region where the pressing force acts on the thin plates during rotation, it is possible to keep the seal clearance at a minimum while maintaining the non-contact of the distal ends of the thin plates and the rotating shaft over the whole area of the shaft seal in the circumferential direction, and effectively prevent leakage of the working fluid from the high-pressure side to the low-pressure side.

The protrusion length of each thin plate when the rotating shaft is stopped may be set so that the protrusion length of each thin plate during rotation of the rotating shaft becomes equal.

Thereby, the seal clearance becomes uniform over all regions of the shaft seal in the circumferential direction during rotating of the rotating shaft. Therefore, it is possible to make the pressure distribution uniform at all regions in the circumferential direction, and possible to obtain to a high degree an effect of preventing leakage of the working fluid by the shaft seal.

The rotary machine according to the present invention has any of the aforementioned shaft seals arranged on the outer periphery of the rotating shaft.

According to a rotary machine with such characteristics, since it is provided with the aforementioned shaft seal, it is possible to prevent contact of the distal ends of the thin plates with the rotating shaft.

Advantage of the Invention

According to the shaft seal and the rotary machine of the present invention, since the protrusion length of the distal ends of the thin plates is set to be small in the vicinity of the end portions of the seal segments in the circumferential direction, even if the lift characteristic of the thin plates decreases during rotation, it is possible to prevent the end portions of the thin plates on the inner peripheral side from making contact with the rotating shaft. Accordingly, it is possible to prevent wear of the thin plates and the rotating shaft, and possible to effectively inhibit leakage of the working fluid.

DESCRIPTION OF EMBODIMENTS

Figure 1:
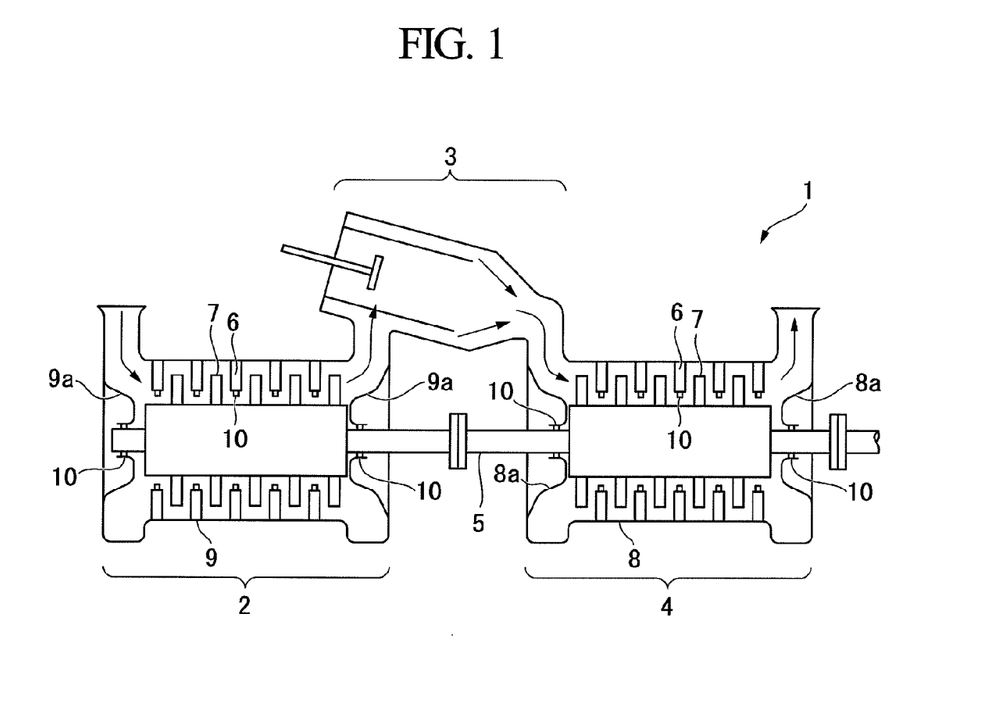
FIG. 1 is an outline configuration drawing of the gas turbine (rotary machine) according to the embodiment.

Hereinbelow, an embodiment of the present invention shall be described in detail with reference to the drawings. Note that in the present embodiment, an example is shown that applies a shaft seal 10 to a gas turbine (rotary machine) 1. FIG. 1 is an outline configuration drawing of the gas turbine 1 of the embodiment.

The gas turbine 1 shown in FIG. 1 has a compressor 2, a combustor 3, a turbine 4, and a rotating shaft 5. The compressor 2 takes in a quantity of air and compresses it. The combustor 3 mixes fuel with the air that has been compressed by the compressor 2 and burns the mixture. The combustion gas that is generated in the combustor 3 is introduced into the turbine 4, which converts the thermal energy of the combustion gas into rotational energy, and thereby rotates. The rotating shaft 5, by transmitting a portion of the power of the rotating turbine 4 to the compressor 2, causes the compressor 2 to rotate.

In the gas turbine 1 of such a configuration, the turbine 4 converts the thermal energy of the combustion gas into mechanical rotational energy by blowing the combustion gas against moving blades 7 provided in the rotating shaft 5 to generate power. In addition to a plurality of the moving blades 7 on the rotating shaft 5 side, a plurality of stationary blades 6 are provided on a casing 8 side of the turbine 4. These moving blades 7 and stationary blades 6 are alternately arranged in the axial direction of the rotating shaft 5.

The moving blade 7 rotates the rotating shaft 5 in response to the pressure of the combustion gas that flows in the axial direction of the rotating shaft 5, and the rotational energy imparted to the rotating shaft 5 is utilized by being extracted from the shaft end. The shaft seal 10 is provided between the stationary blades 6 and the rotating shaft 5 in order to reduce the leakage of the combustion gas that leaks from the high-pressure side to the low-pressure side.

The compressor 2 is connected coaxially with the turbine 4 by the rotating shaft 5, and compresses outside air utilizing the rotation of the turbine 4, and supplies the compressed air to the combustor 3. In the compressor 2, a plurality of the moving blades 7 are provided on the rotating shaft 5 similarly to the turbine 4, and a plurality of the stationary blades 6 are provided on a casing 9 side of the compressor 2. The moving blades 7 and the stationary blades 6 are alternately arranged in the axial direction of the rotating shaft 5. The shaft seal 10 is provided between the stationary blades 6 and the rotating shaft 5 in order to reduce the amount of leakage of the compressed air that leaks from the high-pressure side to the low-pressure side. The shaft seal 10 for preventing leakage of the compressed air or the combustion gas from the high-pressure side to the low-pressure side also is provided at a bearing 9a in which the casing 9 of the compressor 2 supports the rotating shaft 5, and at a bearing 8a in which the casing 8 of the turbine 4 supports the rotating shaft 5.

Note that the shaft seal 10 of the present embodiment is not restricted to application to the gas turbine 1, and for example can be widely applied to all rotary machines that convert energy to work by the relationship of the rotation of a shaft and the flow of a fluid, such as large-sized fluid machinery like a steam turbine, a compressor, a water wheel, a freezer, a pump and the like. Moreover, the shaft seal 10 can be used for inhibiting the flow of a fluid in the axial direction of the rotating shaft 5.

Figure 2:
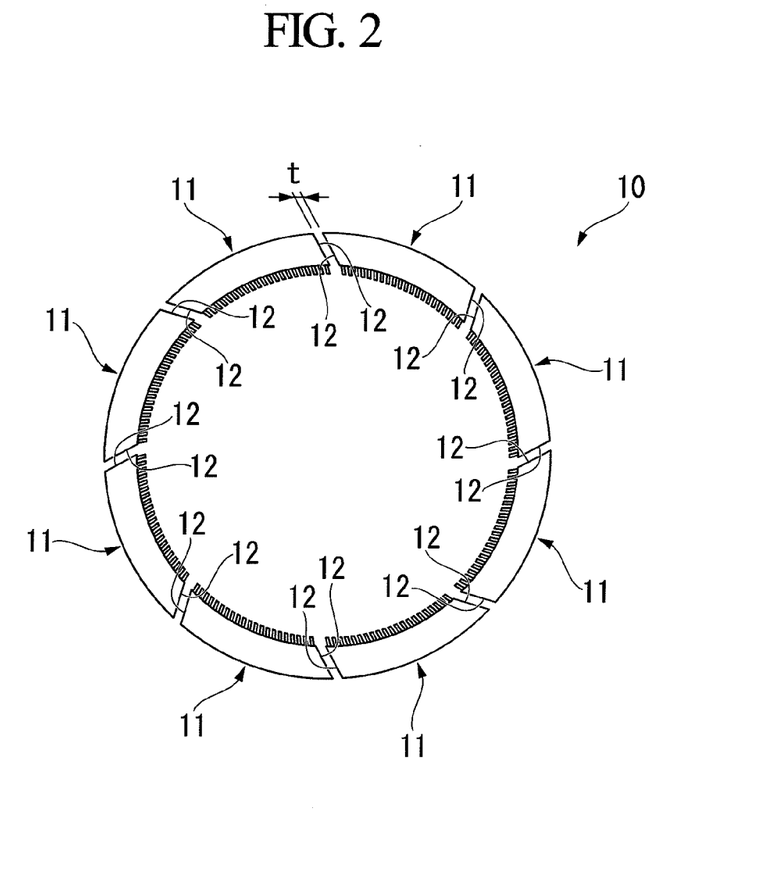
FIG. 2 is an outline configuration drawing of the shaft seal as seen from the axial direction of the rotating shaft.

The shaft seal 10 provided in the gas turbine 1 that is constituted as described above shall be described below referring to the drawing. FIG. 2 is an outline configuration drawing of the shaft seal 10 seen from the axial direction of the rotating shaft 5. From the aspect of ease of assembly, this shaft seal 10 is constituted by a plurality (eight in the present embodiment) of seal segments 11 that extend in an arc shape being arranged in a circular manner in the circumferential direction of the rotating shaft 5 of the aforementioned gas turbine 1. A gap t is formed between end portions 12 in the circumferential direction of adjacent seal segments 11 that are arranged in this manner.

Figure 3:
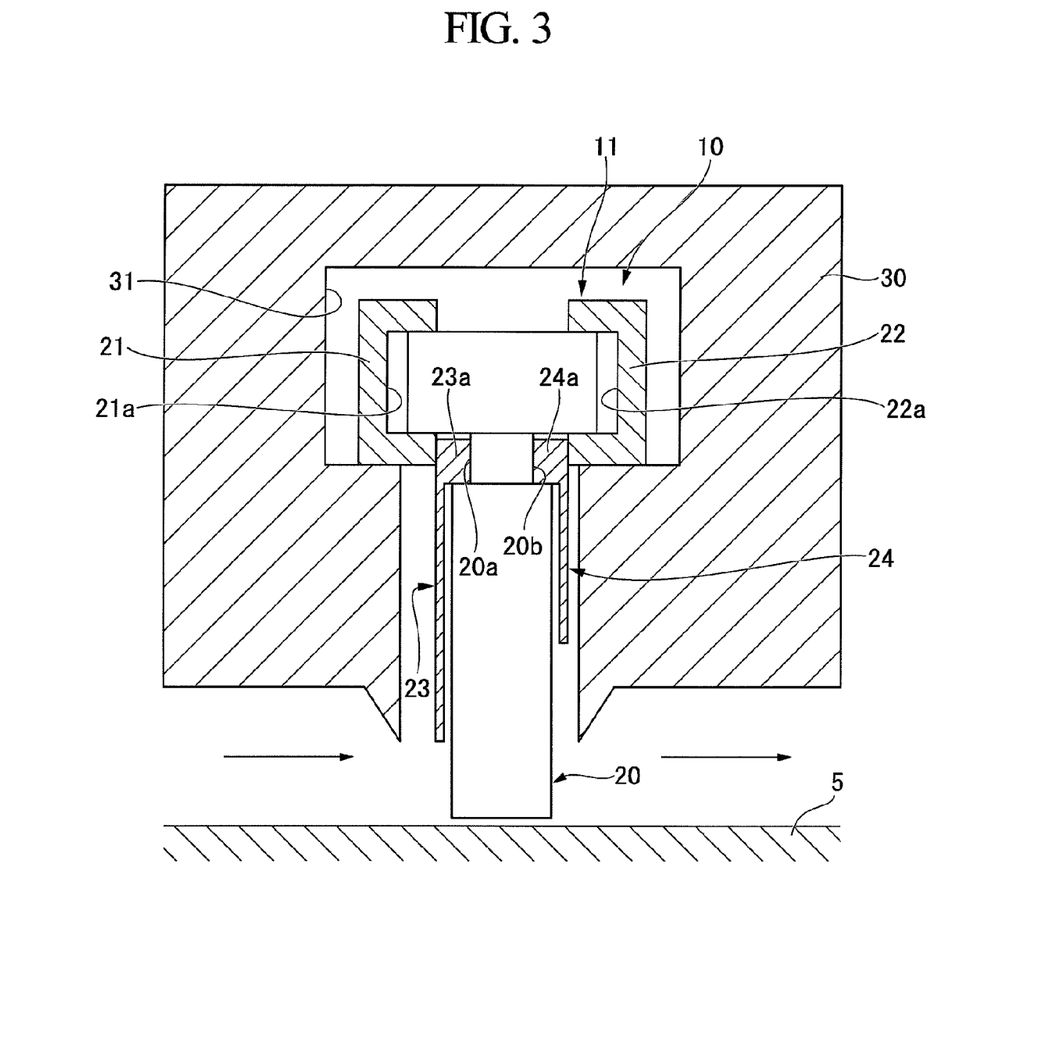
FIG. 3 is a cross-sectional view of the seal segment in a cross section that includes the axial direction of the rotating shaft.
Figure 4:
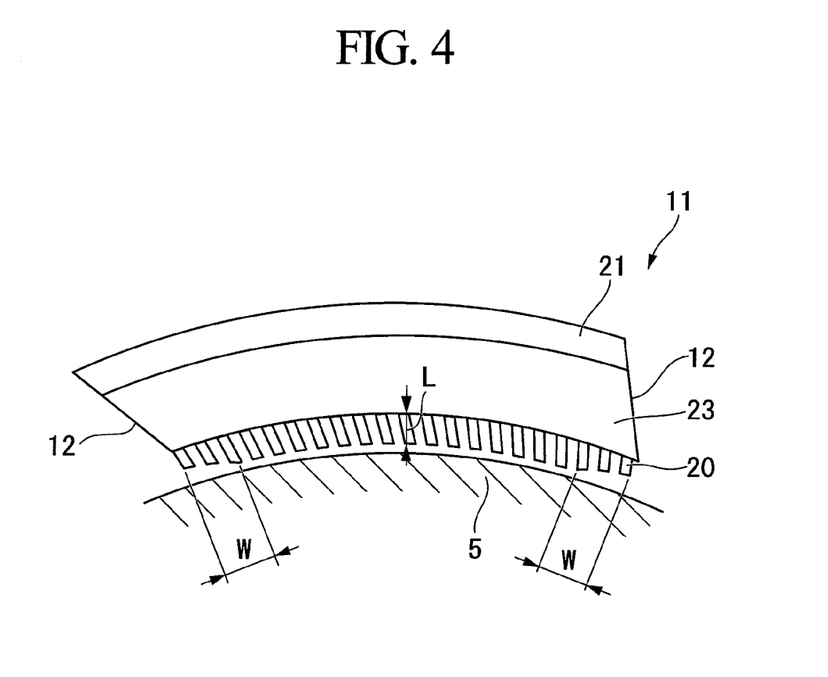
FIG. 4 is an outline configuration drawing of the seal segment as seen from the axial direction of the rotating shaft.

The constitution of each seal segment 11 shall be described with reference to FIG. 3 and FIG. 4. FIG. 3 is a cross-sectional configuration drawing of the seal segment 11 in a cross section that includes the axial direction of the rotating shaft 5. FIG. 4 is an configuration drawing of the seal segment 11 as seen from the axial direction of the rotating shaft 5. Note that in FIG. 3, the paper surface left side is the high-pressure side, and the paper surface right side is the low-pressure side.

Each seal segment 11 is inserted in a housing (equivalent to the stationary blade 6, the moving blade 7, and the bearings 8a and 9a) 30, and it is installed in order to prevent the leakage of the working fluid in the annular space between the rotating shaft 5 and the housing 30. As shown in FIG. 3, this seal segment 11 is constituted from a plurality of thin plates 20, retention rings 21 and 22, a high-pressure side plate 23, and a low-pressure side plate 24. The plurality of thin plates 20 are arranged in an overlapping manner finely spaced apart from each other in the circumferential direction of the rotating shaft 5, and made from metal. The retention rings 21 and 22 are formed in a U shape so as to sandwich the thin plates 20 from both sides at the base ends of the thin plates 20. The base end of the high-pressure side plate 23 is wedged in by the one side edge of the thin plates 20 facing the high-pressure side region and the retention ring 21. The base end of the low-pressure side plate 24 is wedged in by the other side edge of the thin plates 20 facing the low-pressure side region and the retention ring 22.

In the shaft seal 10 constituted in this way, the thin plates 20 are constituted by thin steel sheets with an approximate T-shape in which the width of the inner periphery side (width in the axial direction of the rotating shaft 5) is narrower than the width of the base end (width in the axial direction of the rotating shaft 5) as shown in FIG. 3. At the position where the width of the thin plates 20 becomes narrow, notch portions 20a, 20b are formed at the side edges of both sides.

The plurality of thin plates 20 are stacked so as to have the same width in the axial direction of the rotating shaft 5. This plurality of thin plates 20 are mutually fixed and coupled by for example welding being performed at the base end thereof.

The thin plates 20 have a predetermined rigidity that is determined by the plate thickness in the circumferential direction of the rotating shaft 5. Moreover, the thin plates 20 are fixed to the retention rings 21, 22 so that the angle formed by the thin plates 20 with the peripheral surface of the rotating shaft 5 with respect to the rotation direction of the rotating shaft 5 is an acute angle.

Stepped portions 23a and 24a are provided so that the width at the outer periphery side of the high-pressure side plate 23 and the low-pressure side plate 24 in the rotation direction of the rotating shaft 5 may become wider than the other positions. The stepped portions 23a, 24a are fitted in the notch portions 20a, 20b of the thin plates 20.

The retention ring 21 is provided with a slot 21a in the surface that meets the one side edge (high pressure side) at the base end of the plurality of thin plates 20. Similarly, the retention ring 22 is provided with a slot 22a in the surface that meets the other side edge (low pressure side) at the base end of the plurality of thin plates 20. The slot 21a of the retention ring 21 is fitted onto the one side edge (high pressure side) at the base end side of the plurality of thin plates 20. Similarly, the other side edge (low pressure side) at the base end side of the plurality of thin plates 20 is fitted into the slot 22a of the retention ring 22. Thereby, each thin plate 20 is fixed to the retention rings 21, 22.

An annular slot 31 is formed on the inner peripheral wall surface of the housing 30. A step is provided in the side surfaces of the annular slot 31 facing the side edges of the thin plate 20, so that the width of the outer peripheral side is wider than the width of the inner periphery side in the axial direction of the rotating shaft 5. The thin plates 20, the retention rings 21, 22, the high-pressure side plate 23, and the low-pressure side plate 24 are fitted in the slot 31 of the housing 30, so that the surface facing the inner peripheral side of the retention rings 21, 22 abuts the surface facing the outer peripheral side in this step.

In the shaft seal 10 that is fitted in the housing 30 in this way, the distal ends of the thin plates 20 protrude farther to the rotating shaft 5 side than the high-pressure side plate 23.

In the present embodiment, as shown in FIG. 4, at the thin plates 20 that are arranged in a region W in the vicinity of the circumferential-direction end portion 12 of the seal segment 11, the protrusion length L of the distal ends of the thin plates 20 from the high-pressure side plate 23 is formed shorter than that of the thin plates 20 arranged in the middle in the circumferential direction.

Figure 5:
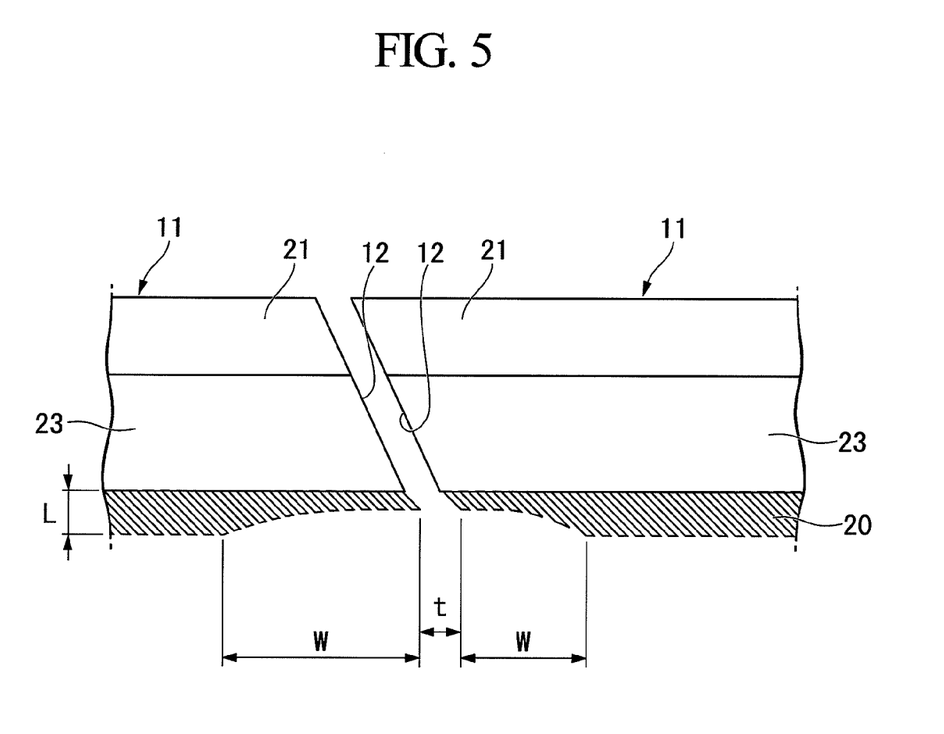
FIG. 5 is a schematic view of the vicinity of circumferential-direction end portions of adjacent seal segments.

FIG. 5 shows a schematic drawing of the vicinity of the circumferential-direction end portions 12 of adjacent seal segments 11, viewed from the axial direction of the rotating shaft 5. As shown in this FIG. 5, at the predetermined region (contact force reduction region) W in the vicinity of the circumferential-direction end portions 12 of each seal segment 11, the protrusion length L is set to be small.

In particular, in the present embodiment, in the thin plates 20 in the contact force reduction region W, the protrusion length L is set to gradually become smaller from the inner side of the seal segment 11 in the circumferential direction to the circumferential-direction end portions 12. The shape that the distal ends of the plurality of thin plates 20 form in the protrusion length reduction region W when viewed from the axial direction of the rotating shaft 5 is an approximate circular arc.

When the rotating shaft 5 is stopped, since the distal ends of the thin plates 20 at other than the aforementioned region W protrude toward the rotating shaft 5 side so as to abut the outer peripheral surface of the rotating shaft 5, a pre-load is imparted by the thin plates 20 on the outer peripheral surface of the rotating shaft 5. At the thin plates 20 that are arranged in the aforementioned region W, since the protrusion length L is set to be small, the pre-load is less than that of the location other than aforementioned region W. Also, when the rotating shaft 5 is stopped, the distal ends thereof do not necessarily make contact with the outer peripheral surface of the rotating shaft 5. That is to say, a gap may be formed between the distal ends of the thin plates 20 and the rotating shaft 5.

The contact force reduction region W is preferably set to a range of approximately 5 to 50 mm from the circumferential-direction end portions 12 of each seal segment 11 to the inner side in the circumferential direction. Moreover, the size of the protrusion length L in this protrusion length reduction region W is preferably set to a range of approximately 0 to 5 mm.

In the present embodiment, by assembling the seal segment 11 using only for the thin plates 20 to be arranged in the aforementioned protrusion length reduction region W those that are of a different length than those in the other regions, it is constituted so that the protrusion length L of the distal ends of the thin plates 20 in the protrusion length reduction region W becomes smaller. In this case, the lengths are individually selected in accordance with the arrangement location of each thin plate 20 whose protrusion length L gradually becomes smaller from the inner side of the seal segment 11 in the circumferential direction toward the circumferential-direction end portion 12.

The behavior of the shaft seal 10 that is constituted in the above manner shall be described. First, the behavior of thin plates 20 that are arranged in the middle of each seal segment 11 in the circumferential direction, that is, at a location separated from the circumferential-direction end portion 12, shall be described using FIG. 6A and FIG. 6B.

Figure 6A:
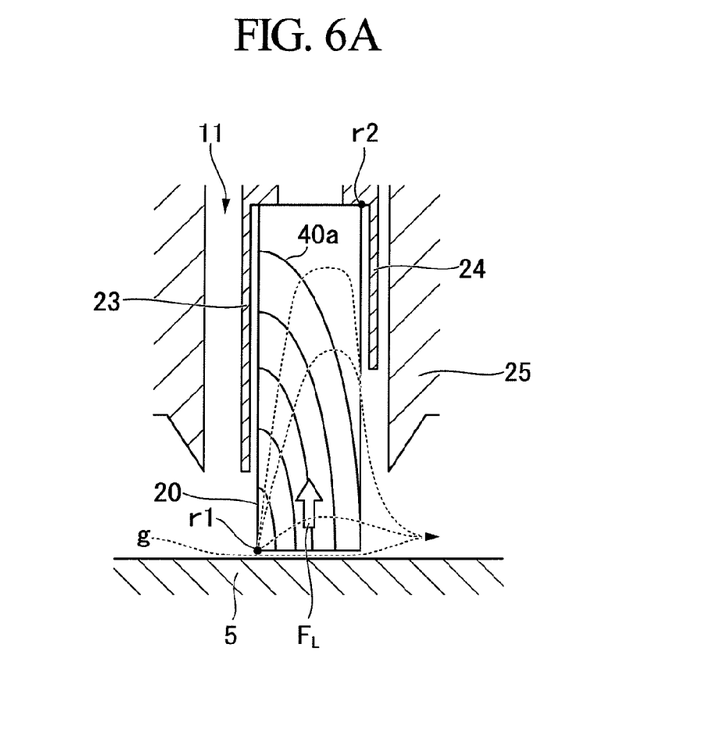
FIG. 6A is a drawing for describing the operation of the thin plate in the middle of the seal segment in the circumferential direction.

As shown in FIG. 6A, in the case of gas pressure of the working fluid that heads from the high-pressure side region to the low-pressure side region being applied to each thin plate 20, a gas pressure distribution 40a is formed in which the gas pressure is highest at the angle portion r1 that is positioned at the distal end and high-pressure side with respect to each thin plate 20, and the gas pressure gradually weakens toward a diagonal angle portion r2. Note that the thin plates that are shown in FIG. 3 have a T-shape, but in order to simplify the description, only the rectangular portion in which bending occurs is shown in FIG. 6A and FIG. 6B, with the illustration of other portions being omitted.

Figure 6B:
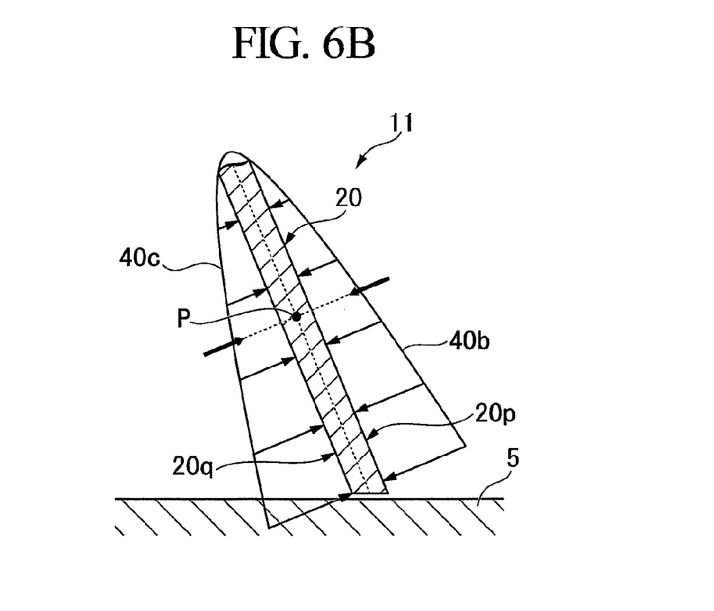
FIG. 6B is a drawing for describing the operation of the thin plate in the middle of the seal segment in the circumferential direction.

As shown in the cross-sectional view along the circumferential direction of the rotating shaft 5 shown in FIG. 6B, the surface that faces the rotating shaft 5 of the thin plate 20 is called a lower surface 20q, and the reverse side is called the upper surface 20p. Then, when a gas pressure distribution 40a is formed as shown in FIG. 6A by a gas pressure from the high-pressure side region to the low-pressure side region being applied to each thin plate 20, the gas pressure is adjusted so that the gas pressure that is applied to the lower surface 20q becomes higher than the gas pressure that is applied to the upper surface 20p at an arbitrary position along the cross section of each thin plate 20.

Under these circumstances, the working fluid g that flows from the high-pressure side region toward the low-pressure side region flows in between the high-pressure side plate 23 and the outer peripheral surface of the rotating shaft 5. Then, the working fluid g flows between the outer peripheral surface of the rotating shaft 5 and the distal ends of the thin plates 20, and flows in a radial manner from the angle portion r1 in the direction of the angle portion r2 along the upper surface 20p and the lower surface 20q of each thin plate 20. Thus, the region of low pressure spreads toward the base end of the thin plate 20 due to the flow of the working fluid g in this way. Therefore, as shown in FIG. 6B, the gas pressure distributions 40b and 40c that are applied perpendicularly to the upper surface 20p and the lower surface 20q of each thin plate 20 become larger the closer to the distal end of the thin plate 20 and smaller the farther toward the base end of the thin plate 20.

Although the gas pressure distributions 40b and 40c at of upper surface 20p and the lower surface 20q, respectively, have approximately equivalent shapes, each thin plate 20 is arranged so that the angle with respect to the peripheral surface of the rotating shaft 5 becomes an acute angle. For that reason, the relative position of each gas pressure distribution 40b and 40c in the upper surface 20p and the lower surface 20q shifts. Therefore, a difference arises in the gas pressure of the upper surface 20p and the lower surface 20q at an arbitrary point P from the base end to the distal end of the thin plate 20. That is to say, in the thin plate 20, the gas pressure that is applied to the lower surface 20q becomes higher than the gas pressure applied to the upper surface 20p. Thereby, a lift force FL is generated in a direction that lifts the distal end of the thin plate 20 from the rotating shaft 5.

As described above, the lift force FL acts on each thin plate 20 by causing a pressure differential to be generated between the upper surface 20p and the lower surface 20q of each thin plate 20 in the middle of each seal segment 11 in the circumferential direction. Thereby, the distal end of the thin plate 20 is deformed so as to float from the outer peripheral surface of the rotating shaft 5. That is to say, the distal end of the thin plate 20 makes contact with the peripheral surface of the rotating shaft 5 due to the predetermined pre-load when the rotating shaft 5 is stopped, but when the rotating shaft 5 is rotating, the lift force FL acts on the distal end of the thin plate 20. For that reason, a non-contact state arises in which the thin plate 20 floats up from the rotating shaft 5, and a predetermined seal clearance is formed.

Figure 7A:
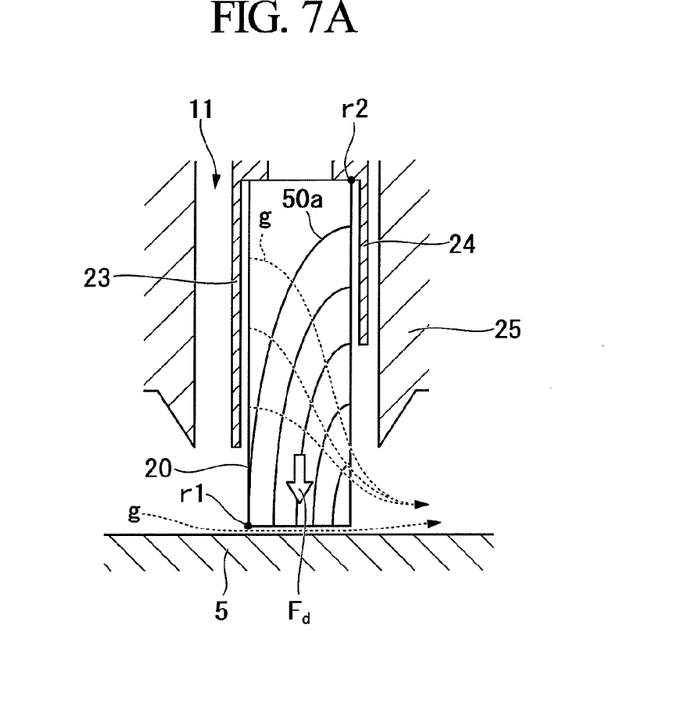
FIG. 7A is a drawing for describing the operation of the thin plate and the end portion of the seal segment in the circumferential direction.
Figure 7B:
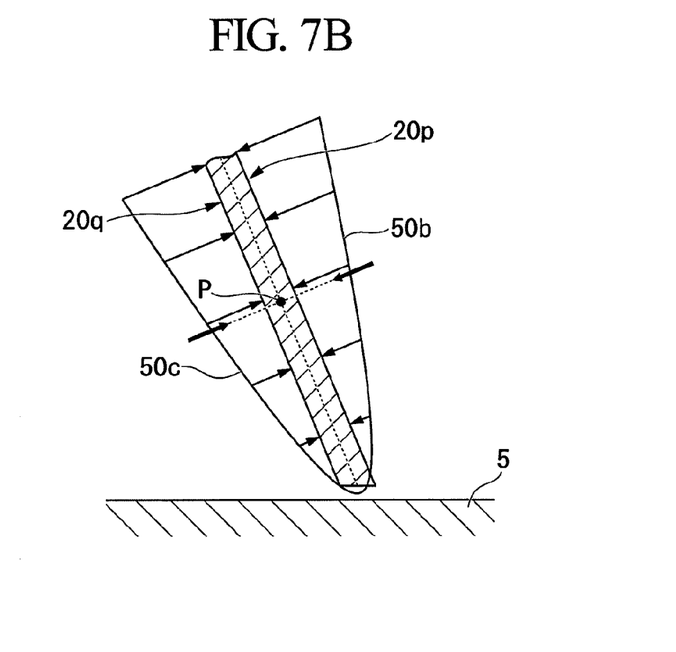
FIG. 7B is a drawing for describing the operation of the thin plate at the end portion of the seal segment in the circumferential direction.

Next, the behavior of the thin plate 20 in the vicinity of the circumferential-direction end portion 12 of each seal segment 11 shall be described using FIG. 7A and FIG. 7B.

In the vicinity of this circumferential-direction end portion 12, since the working fluid g flows in from a gap t that is formed between the circumferential-direction end portions 12 of adjacent seal segments 11, a disturbance occurs in the pressure distribution.

That is to say, gas pressure from the high-pressure side region to the low-pressure side region is applied to each thin plate 20, and when the gas pressure distribution 50a is formed as shown in FIG. 7A, the gas pressure that is applied to the lower surface 20q becomes less than the gas pressure that is applied to the upper surface 20p at an arbitrary position along the cross section of each thin plate.

In greater detail, the working fluid g that flows from the high-pressure side region to the low-pressure side region flows in between the gap t, and as shown in FIG. 7A, flows parallel to the axial direction along the upper surface 20p and the lower surface 20q of each thin plate 20 from the entire side edge of the high-pressure side in the thin plate 20, and then changes to a downward flow at the inside of the thin plate 20, and flows out to the low-pressure side region.

Thus, a low-pressure region spreads toward the distal end of the thin plate 20 as a result of the flowing of the working fluid g. For that reason, the gas pressure distributions 50b and 50c that are applied perpendicularly to the upper surface 20p and the lower surface 20q of each thin plate 20 become smaller the closer to the distal end of the thin plate 20, and become larger the farther toward the base end of the thin plate 20, as shown in FIG. 7B.

Although the gas pressure distributions 50b and 50c at of upper surface 20p and the lower surface 20q, respectively, have approximately equivalent shapes, each thin plate 20 is arranged so that the angle with respect to the outer peripheral surface of the rotating shaft 5 becomes an acute angle. For that reason, the relative position of each gas pressure distribution 50b and 50c in the upper surface 20p and the lower surface 20q shifts. Therefore, a difference arises in the gas pressure of the upper surface 20p and the lower surface 20q at an arbitrary point P from the base end to the distal end of the thin plate 20. That is to say, in the thin plate 20, the gas pressure that is applied to the upper surface 20p becomes higher than the gas pressure applied to the lower surface 20q, and a pressing force Fd is generated that presses the thin plate 20 toward the rotating shaft 5 side.

As described above, the pressing force Fd acts on each thin plate 20 at the circumferential-direction end portions 12 of each adjacent seal segment 11. Thereby, the lift force FL that acts on the thin plate 20 is offset, and the lift characteristic of the thin plate 20 falls.

On this point, in the shaft seal 10 of the present embodiment, even if the pressing force Fd occurs in the vicinity of the circumferential-direction end portion 12 of the seal segment 11, and the floatation characteristic of the thin plate 20 drops, the distal end of each thin plate 20 does not make contact with the rotating shaft 5.

That is to say, in the present embodiment, in the vicinity of the circumferential-direction end portions 12 of the seal segment 11 where the pressure distribution becomes unstable, the protrusion length L of the distal end of the thin plates 20 is set to be small. Accordingly, when the pressing force Fd toward the rotating shaft 5 acts on the thin plates 20 during rotation of the rotating shaft 5, the distal end of the thin plates 20 does not reach the outer periphery of the rotating shaft 5. This prevents wear of each thin plate 20 and of the rotating shaft 5 of the gas turbine 1, and heat generation, and thereby it is possible to achieve a longer service live of these members.

Here, the aforementioned pressure distribution enters its most unstable state at the circumferential-direction end portions 12 of the seal segment 11, and is gradually resolved heading toward the inside in the circumferential direction. Accordingly, the pressing force Fd that occurs on the thin plates 20 also becomes greatest at the circumferential-direction end portions 12 of the seal segment 11 and becomes smaller heading toward the inside in the circumferential direction. On the other hand, it is not preferable for the seal clearance to increase during rotation in order to prevent the working fluid from leaking from the high-pressure side to the low-pressure side.

In contrast, in the present invention, the protrusion length L of the thin plates 20 is set so as to gradually become smaller from the inner side of the seal segment 11 in the circumferential direction to the circumferential-direction end portions 12. Thereby, in the event of the lift characteristic having decreased as a result of the pressing force Fd acting on the thin plates 20 in the contact force reduction region W during rotation, while maintaining non-contact between the distal end of the thin plates 20 and the rotating shaft, it is possible to make the seal clearance a minimum so as to reliably prevent leakage of the working fluid from the high-pressure side to the low-pressure side.

Also, the aforementioned pressing force Fd occurs in a range of approximately 5 to 50 mm along the circumferential direction from each circumferential-direction end portion 12 of the seal segment 11, although depending on the diameter of the shaft seal 10 and the pressure difference between the high-pressure side region and the low-pressure side region. Regarding this point, in the present embodiment, the range of the protrusion length reduction region W is set to a region of approximately 5 to 50 mm along the circumferential direction from each circumferential-direction end portion 12 of the seal segment 11. That is to say, the range of the protrusion length reduction region W is set so as to correspond to the region in which the floatation characteristic drops due to the action of the aforementioned pressing force Fd.

In this way, the protrusion length of only those thin plates 20 in the range in which the lift characteristic of the thin plates 20 falls when the rotating shaft 5 is rotated is made smaller. For that reason, it is possible to make the seal clearance a minimum and to effectively prevent leakages of the working fluid while maintaining the non-contact of the distal end of the thin plates 20 and the rotating shaft 5 along the entire region of the shaft seal 10 in the circumferential direction.

Hereinabove, an embodiment of the present invention was described in detail, but it is not limited thereto and some design modifications are possible provided they do not depart from the technical idea of the present invention.

For example, when setting the protrusion length L of each thin plate 20, the protrusion length L of each thin plate 20 when the rotating shaft 5 is stopped may be individually set so that the protrusion length L of all the thin plates 20 in the seal segment 11 may become equal during rotation of the rotating shaft 5.

That is, during rotation of the rotating shaft 5, the lift force FL and the pressing force Fd act in accordance with the arrangement location of each thin plate 20 in the seal segment 11. By understanding the lift characteristic of each thin plate 20 when the lift force FL and the pressing force Fd act, and individually setting the length dimension of the thin plate 20 so that the protrusion length L of each thin plate 20 during rotation becomes equal, it is possible to make the distance between the distal end of the thin plate 20 and the rotating shaft 5 uniform over the entire shaft seal 10 in the circumferential direction during rotation. Thereby, it is possible to reliably prevent leakage of the working fluid from the high-pressure side to the low-pressure side while maintaining the non-contact of the distal end of the thin plates 20 and the outer peripheral surface of the rotating shaft 5.

The shape formed by the distal ends of the thin plates 20 that are arranged in the protrusion length reduction region W from the axial direction of the rotating shaft 5 is preferably arc-shaped as in the present embodiment, but is not limited thereto. For example, it may have a linear shape, and it may also be another shape. That is to say, any shape is possible provided the protrusion length L of the thin plates 20 in the protrusion length reduction region W is less than the protrusion length L of the thin plates 20 in the region other than the protrusion length reduction region W. Thereby, it is possible to prevent the distal end of the thin plates 20 from coming into contact with the outer peripheral surface of the rotating shaft 5 during rotation of the rotating shaft 5.

Figure 8:
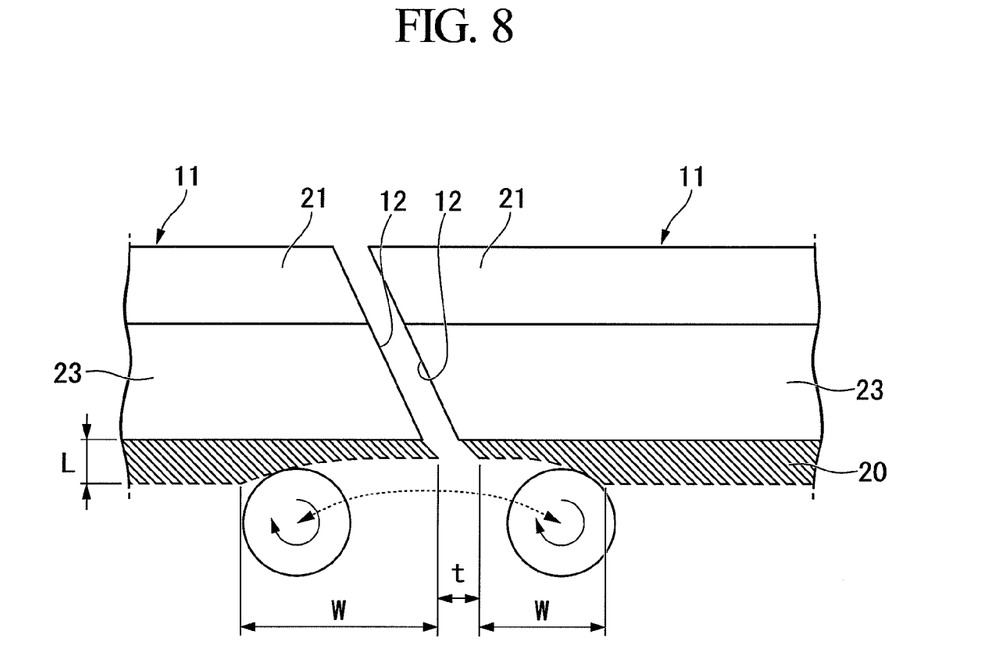
FIG. 8 is a drawing that describes the method of setting the protrusion length at the protrusion length reduction region by mechanical polishing.

Note that in this embodiment, by assembling the seal segment 11 using thin plates 20 of different lengths that are arranged in the protrusion length reduction region W, it is constituted so that the protrusion length L of the distal end of the thin plates 20 becomes less in the protrusion length reduction region W, but it is not limited thereto. For example, after assembling the seal segment 11 using thin plates 20 that are all of the same length, as shown in FIG. 8, mechanical polishing may be performed on the group of thin plates 20 that are in the protrusion length reduction region W from the inner periphery side of the seal segment 11. Thereby, it is possible to easily form a shaft seal 10 in which the protrusion length L gradually becomes smaller heading from the inner side of the seal segment 11 in the circumferential direction to the circumferential-direction end portion 12.

INDUSTRIAL APPLICABILITY

According to the shaft seal and the rotary machine of the present invention, it is possible to prevent wear of the thin plates and the rotating shaft, and possible to effectively inhibit leakage of the working fluid.

DESCRIPTION OF REFERENCE NUMERALS 1 gas turbine (rotary machine)
5 rotating shaft
10 shaft seal
11 seal segment
12 circumferential-direction end portion
20 thin plate
23 high-pressure side plate (side plate)
24 low-pressure side plate (side plate)
100 shaft seal
101 rotating shaft
102 housing
103 low-pressure side plate
104 high-pressure side plate
105 thin plate
L protrusion length
t gap
W protrusion length reduction region
Fd pressing force
FL lift force

The invention claimed is:

1. A shaft seal that is constituted by annularly arranging a plurality of seal segments in the circumferential direction of a rotating shaft, wherein each seal segment comprises:
    a plurality of thin plates that are provided in a predetermined arrangement in the circumferential direction of the rotating shaft;
    side plates that sandwich the plurality of thin plates from both sides thereof in the axial direction; and
    retention rings that hold the base ends of the plurality of thin plates and the base ends of the side plates;
    the distal ends of the thin plates protrude farther toward the rotating shaft than the distal ends of the side plates; and
    the protrusion length of the distal ends of the thin plates in the vicinity of the end portions in the circumferential direction where adjacent seal segments are connected is set to be less than the protrusion length of the distal ends of the thin plates that are located at the middle of the seal segment in the circumferential direction, at least one of the thin plates in the vicinity of the end portions in the circumferential direction having a length that is shorter than a length of at least one of the thin plates located at the middle of the seal segment in the circumferential direction.

2. The shaft seal according to claim 1, wherein the protrusion length of the thin plates in the vicinity of the end portions in the circumferential direction gradually becomes small heading from the inner side of the seal segment in the circumferential direction toward the end portions in the circumferential direction.

3. The shaft seal according to claim 1, wherein a region where the protrusion length of the thin plates in the vicinity of the end portions in the circumferential direction is set to be small is a region where the lift force relatively decreases with respect to the middle portion in the circumferential direction.

4. The shaft seal according to claim 2, wherein a region where the protrusion length of the thin plates in the vicinity of the end portions in the circumferential direction is set to be small is a region where the lift force relatively decreases with respect to the middle portion in the circumferential direction.

5. The shaft seal according to claim 1, wherein the protrusion length of each thin plate when the rotating shaft is stopped is set so that the protrusion length of each thin plate during rotation of the rotating shaft becomes equal.

6. The shaft seal according to claim 2, wherein the protrusion length of each thin plate when the rotating shaft is stopped is set so that the protrusion length of each thin plate during rotation of the rotating shaft becomes equal.

7. The shaft seal according to claim 3, wherein the protrusion length of each thin plate when the rotating shaft is stopped is set so that the protrusion length of each thin plate during rotation of the rotating shaft becomes equal.

8. The shaft seal according to claim 4, wherein the protrusion length of each thin plate when the rotating shaft is stopped is set so that the protrusion length of each thin plate during rotation of the rotating shaft becomes equal.

9. A rotary machine in which the shaft seal according to claim 1 is arranged on the outer periphery of the rotating shaft.

10. A rotary machine in which the shaft seal according to claim 2 is arranged on the outer periphery of the rotating shaft.

11. A rotary machine in which the shaft seal according to claim 3 is arranged on the outer periphery of the rotating shaft.

12. A rotary machine in which the shaft seal according to claim 4 is arranged on the outer periphery of the rotating shaft.

13. A rotary machine in which the shaft seal according to claim 5 is arranged on the outer periphery of the rotating shaft.

14. A rotary machine in which the shaft seal according to claim 6 is arranged on the outer periphery of the rotating shaft.

15. A rotary machine in which the shaft seal according to claim 7 is arranged on the outer periphery of the rotating shaft.

16. A rotary machine in which the shaft seal according to claim 8 is arranged on the outer periphery of the rotating shaft.

\* \* \* \* \*